(No Model.)  3 Sheets—Sheet 1.
A. E. CREIGH.
AUTOMATIC KNIFE GRINDER.
No. 417,001.  Patented Dec. 10, 1889.
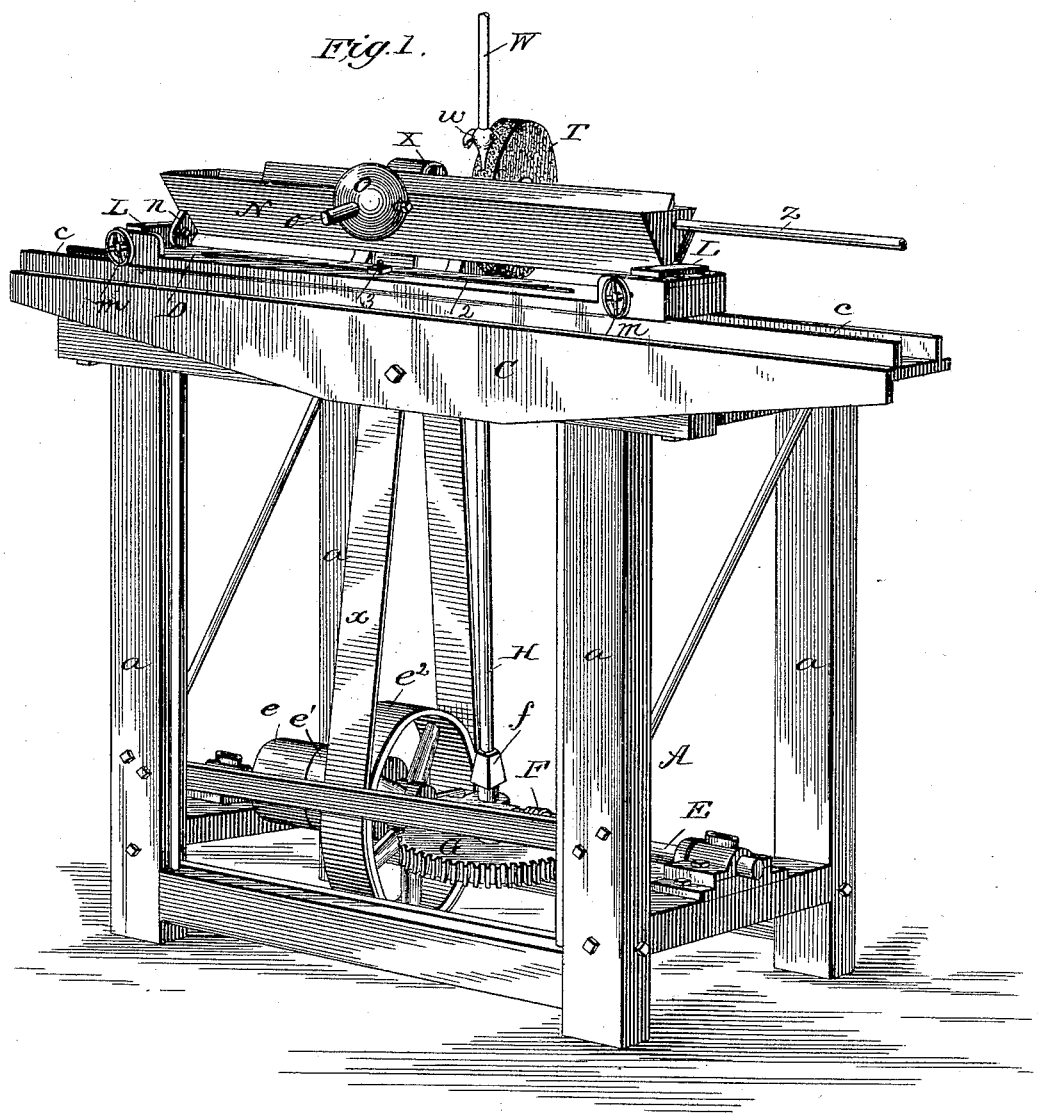

(No Model.) 3 Sheets—Sheet 2.
A. E. CREIGH.
AUTOMATIC KNIFE GRINDER.
No. 417,001. Patented Dec. 10, 1889.
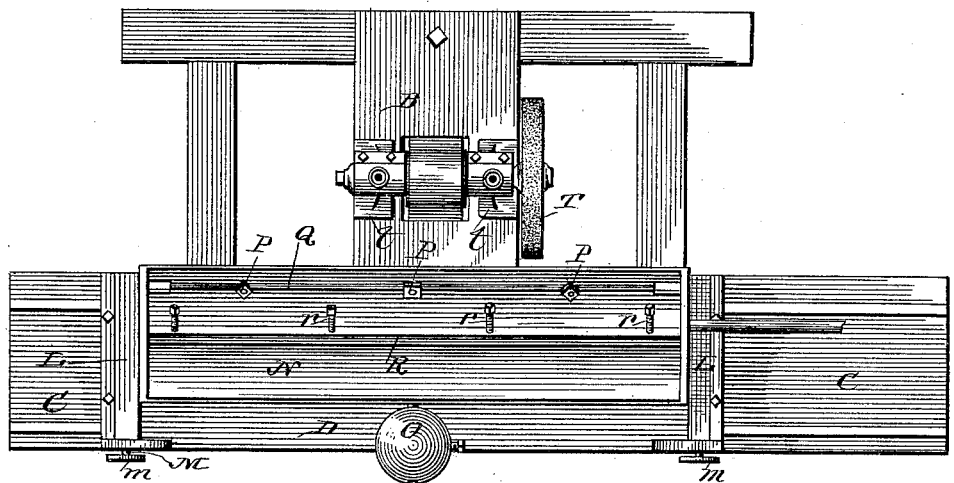
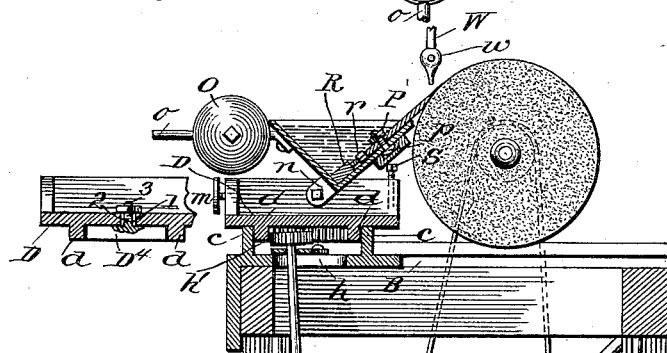
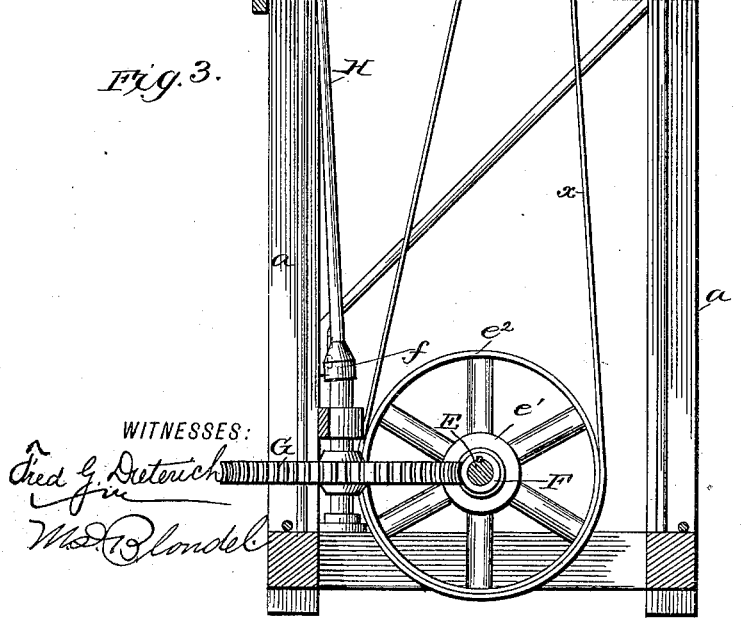
WITNESSES:
INVENTOR.
A. E. Creigh
BY
ATTORNEY (No Model.) 3 Sheets—Sheet 3.
A. E. CREIGH.
AUTOMATIC KNIFE GRINDER.
No. 417,001. Patented Dec. 10, 1889.
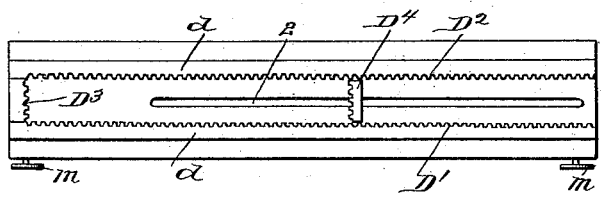
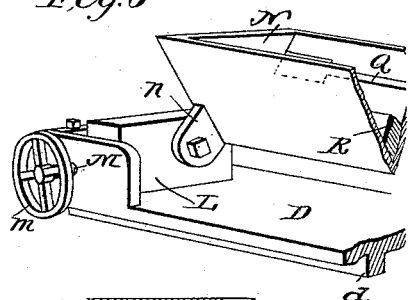
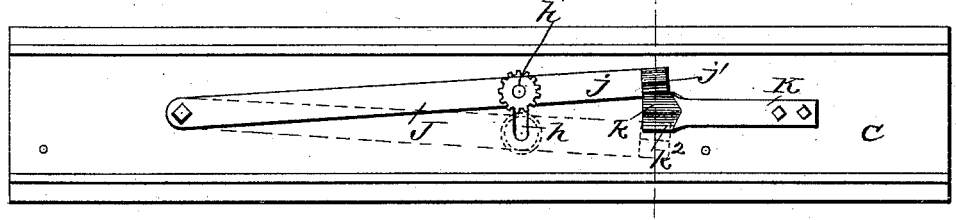
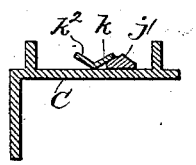
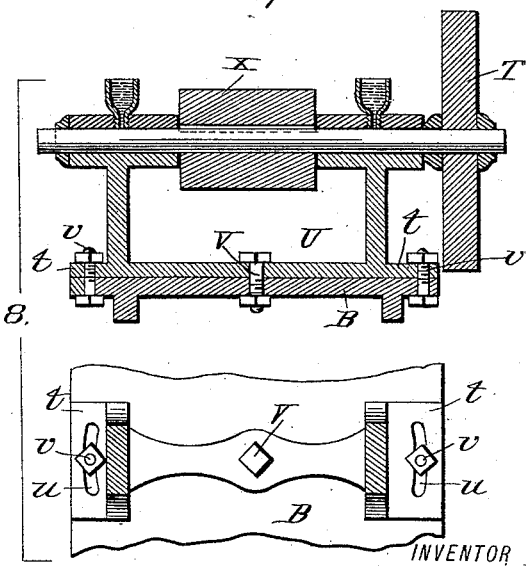
WITNESSES:
Fred G. Dieterich
M. Blondel
INVENTOR
A. E. Creigh
BY Munn & Co
ATTORNEY

UNITED STATES PATENT OFFICE.

ALFRED EDGAR CREIGH, OF RONCEVERTE, WEST VIRGINIA.

AUTOMATIC KNIFE-GRINDER.

SPECIFICATION forming part of Letters Patent No. 417,001, dated December 10, 1889.

Application filed August 10, 1889. Serial No. 320,427. (No model.)

*To all whom it may concern:*

Be it known that I, ALFRED EDGAR CREIGH, residing at Ronceverte, in the county of Greenbrier and State of West Virginia, have invented certain new and useful Improvements in Automatic Knife-Grinders, of which the following is a specification.

My invention relates to automatic knife-grinders for planing-mills, box-factories, furniture-factories, &c.; and it has for its object to provide a grinding-machine which will automatically carry the knife back and forth in contact with the grinding-wheel, and which can be so adjusted that when the knife has been ground to the desired degree the knife will be automatically held from contact with the grinding-wheel.

It has also for its object to provide means so that it will be impossible to draw the temper from the knife being ground.

To this end my invention consists in certain novel features of construction and peculiar combination of parts, all of which will be hereinafter fully described in the annexed specification, and particularly pointed out in the claims, reference being had to the accompanying drawings, in which—

Figure 1 is a perspective view of my improved knife-grinder. Fig. 2 is a top plan view of the same. Fig. 3 is a vertical cross-section taken on the line 3 3, Fig. 1. Fig. 4 is an inverted view of the carriage. Fig. 5 is a view illustrating the pivotal bearing of the knife-trough. Fig. 6 is a top plan view of the guide-plate with the carriage removed. Fig. 7 is a detail cross-section on the line 7 7, Fig. 6. Fig. 8 is a view illustrating the grinding-wheel support and its connection with the main frame, and Fig. 9 is an edge view of a full-sized planer-knife.

In the accompanying drawings, A indicates a frame upon which my improvements are mounted, and which consists of the supporting-legs $a\ a$, which support the main platform B, upon which the grinding-wheel and the knife-carriage are mounted. At one edge of the platform B, I form a metal guide-frame C, provided with vertical guide-flanges $c\ c$, between which fit and slide the depending flanges $d\ d$ of the reciprocating knife-carriage D. The inner faces of the flanges are formed with longitudinal cog-racks $D'\ D^2$, which are connected at one end by the stationary transverse rack-section $D^3$ and at the opposite end by the adjustable cog-rack section $D^4$, which is provided with a vertical stem 1, which passes through a longitudinal slot 2 and is held in adjusted position by means of a nut 3, as clearly shown in the drawings.

E indicates the drive-shaft journaled in the lower end of the frame, which is provided with loose and tight pulleys $e$ and $e'$ and the driving-pulley $e^2$. This shaft is also provided with a worm-wheel F, which meshes with a worm-gear G, journaled on the lower end of a vertical shaft H, the upper end of which passes through a transverse slot $h$, formed in the guideway C, and has mounted on said end a cog-gear $h'$, which is arranged to engage the rack-sections on the carriage and cause same to travel back and forth in a manner presently explained. To permit the upper end of the shaft being moved transversely, I provide the same near its lower end with a knuckle or universal joint, as shown at $f$.

By the aforesaid construction it will be observed that in operation the cog-wheel $h'$ will engage the rack-section $D'$, drive the carriage forward until the fixed section $D^3$ engages the cog-wheel, which in its revolution will travel on said section $D^3$ over to the opposite rack-section $D^2$ and cause the carriage to travel in a reverse direction until the adjustable section $D^4$ engages the wheel $h'$, which will then swing over in engagement with section $D'$ and operate as before. To hold the said cog-wheel in engagement with the longitudinal rack-bar, I journal the upper end of the shaft H in an oscillating bar J, pivoted at one end in the guideway, as most clearly shown in Fig. 6 of the drawings. The opposite end of such bar is extended, as at $j$, and provided on the upper face of said end with a convex projection $j'$, which is arranged to engage a concave face $k^2$ of a flat spring K, also secured to the guideway, as shown. It will thus be seen that when the arm J is swung over, as shown in full lines, Fig. 6, it will be held in place by the edge $k$ of the spring K, and when swung to the opposite side, as shown in dotted lines, it will engage the edge $k^2$ of said spring.

It will be understood that the adjustable rack-section is adjusted in the slot $h$ in relation to the length of the knife being ground.

In each end of the carriage D, I provide sliding boxes L L, through which pass screw-shafts M M, journaled in the ends of the carriage, as clearly shown in Fig. 5 of the drawings. The outer ends of the shafts M M are provided with hand-wheels $m\ m$, by turning which the sliding boxes may be adjusted transversely across the carriage.

N denotes the knife-holding trough, which is provided at each end with depending lugs or ears $n\ n$, pivotally secured to the sliding boxes L L.

By reference to the drawings it will be observed that the trough N is so supported that it swings toward the grinding-wheel T, and to balance the same in relation to the grinding-wheel as may be desired I provide the outer edge of said trough with a counter-weight O, adjustable on the rod $o$, as shown. By this means the weight or pressure of the knife on the grinding-wheel may be readily adjusted.

The trough N is provided with a longitudinal slot Q, adapted to receive the heads $p$ of the knife-holding bolts P', said slot being arranged in the front wall of said trough, while in the lower portion of the trough I provide a longitudinal flange or offset R, provided with a series of set-screws $r\ r$, which extend up toward the slot Q, for the purpose of adjusting a planer-knife so that the same may be ground to a correct balance.

S denotes an adjustable stop, preferably formed of a set-screw, by which the same bevel is maintained in a set of knives, and which also relieves the pressure against the grinding-wheel and automatically stops the operation of grinding as soon as a rest upon the head of said screw is obtained.

The grinding-wheel T is journaled in the swinging frame U, centrally pivoted, as at V, to the platform B, while the outer ends or feet $t\ t$ of said frame are provided with curved slots $u\ u$, through which pass the adjusting-screws $v\ v$, as most clearly shown in Fig. 8 of the drawings. By this construction the grinding-wheel T may be adjusted perfectly at right angles to the knife, thereby maintaining a perfect face upon the grinder and preventing glaze on the face of the wheel.

W denotes a water-pipe provided with a stop-cock $w$, which is arranged to supply a water-jet on the edge of the knife at the point of contact with the grinder, but so arranged as to keep the water from coming in contact with the grinder. The water from the pipe W is collected in the trough, immersing at least one-half of the knife-body, and discharges through the overflow-pipe Z. The water which remains in the trough serves to keep the knife cool, thereby maintaining the temper of the knife.

X denotes a band-pulley on the grinding-wheel shaft, which is belted with the drive-wheel on the main shaft by the belt $x$.

From the foregoing description, taken in connection with the drawings, the operation and advantages of my improvement will readily be understood.

It will be observed that the reciprocating knife-carriage can be adjusted so as to feed knives of various lengths over the face of the grinding-wheel. By adjusting the bearing-boxes for the shaft of the grinding-wheel as described allows the wheel to be so adjusted as to cause one edge to bear harder than the other, thereby causing the wheel to cut its own glaze off. This movement of the wheel, being alternated with each knife ground, maintains the proper face of emery-wheel. It will also be seen that the pressure of the knife against the grinding-wheel being regulated by a weight on the opposite side of the trough to which the knife is attached, and said trough being pivoted at each end in laterally-adjustable boxes, the knife is adjusted to any bevel desired, and by arranging a set-screw in the carriage, as described, the same can be readily adjusted to automatically stop the knife from grinding, as before described.

By constructing a machine in the manner described I am enabled to use a small emery-wheel eight inches in diameter, having one and one-half inch face, calculated to run two thousand seven hundred revolutions per minute.

In Fig. 9 I have shown a full-sized end section of a planer-knife, showing the concave bevel when ground by a small emery-wheel.

Having thus described my invention, what I claim, and desire to secure by Letters Patent, is—

1. The combination, with the grinding-wheel, the knife-supporting trough, and the knife adjustably secured in the wall of the trough adjacent to the grinding-wheel, the said knife normally bearing against the upper peripheral edge of said grinding-wheel, said trough provided with an overflow-pipe, of the feed-pipe W, disposed over the bearing edge of the knife, whereby the water therefrom will drop on the said edge of the knife and discharge into the trough, substantially as and for the purpose described.

2. In a knife-grinding machine, essentially as described, the combination, with the main frame provided with a transverse slot, as $h$, the guideway mounted thereon, the reciprocating knife-carriage provided with longitudinal and transverse rack-sections, and a laterally-movable bearing-bar J, located on the frame within the said rack-sections, of a laterally-movable gear mounted upon the upper end of a swinging shaft having a pivotal bearing at its lower end, its upper end passed through the slot $h$ and journaled in the bar J, said gear adapted to alternately engage said rack-sections, and means for operating said shaft, substantially as and for the purpose described.

3. The combination, with the main frame, the guideway supported thereon, the reciprocating knife-carriage held to slide on said guideway, said carriage provided with a longitudinal slot, longitudinal rack-sections D' D², and a transverse rack-section D³, fixedly secured to the carriage, and a movable transverse rack-section D⁴, adjustably secured in said longitudinal slot, of a laterally-movable gear mounted upon the upper end of a shaft having a knuckle-joint, said gear adapted to alternately engage said rack-sections, and means for operating said jointed shaft, substantially as shown and described.

4. The combination, with the main frame, the guideway mounted thereon provided with a transverse slot in its base, the reciprocating knife-carriage held to slide on said guideway, said carriage provided with longitudinal and transverse cog-rack sections on its lower face, as described, of a jointed vertical shaft extended through the transverse slot in the guideway and adapted to swing laterally therein, a swinging arm pivoted to the guideway and extended over said slot, forming the upper bearing for the said shaft, a cog-gear mounted on the upper end of said shaft and adapted to alternately engage the cog-sections on the carriage, and a spring-plate secured to the guideway engaging said swinging arm and adapted to hold same in its shifted positions, and means for operating the vertical shaft, substantially as shown and described.

5. The combination, with the guideway and the grinding-wheel, of the reciprocating carriage held to slide on said guideway, said carriage consisting of the base portion engaging said guideway, provided with laterally-adjustable boxes mounted in the end walls thereof, and a knife-trough pivoted to said boxes and adapted to normally swing toward the grinding-wheel, all arranged substantially as and for the purpose described.

6. In a knife-grinding machine, essentially as described, a reciprocating knife-trough provided with a longitudinal slot in one of its walls adapted to receive the head of the knife-holding screws, adjustable screws arranged in the bottom of the trough and projected toward said slot, said screws adapted to form abutments for the lower edge of the knife, substantially as and for the purpose described.

ALFRED EDGAR CREIGH.

Witnesses:
J. M. KINPORTS,
J. M. PRICE.